United States Patent
Miyawaki et al.

(10) Patent No.: US 12,409,510 B2
(45) Date of Patent: Sep. 9, 2025

(54) BONDING DEVICE

(71) Applicant: Honda Motor Co., Ltd., Tokyo (JP)

(72) Inventors: Akiyoshi Miyawaki, Saitama (JP); Taichi Kurihara, Tokyo (JP); Yuto Ike, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/797,543

(22) Filed: Aug. 8, 2024

(65) Prior Publication Data
US 2025/0083250 A1 Mar. 13, 2025

(30) Foreign Application Priority Data

Sep. 11, 2023 (CN) .......................... 202311164540.9

(51) Int. Cl.
*B23K 20/00* (2006.01)
*B23K 20/12* (2006.01)

(52) U.S. Cl.
CPC ........ *B23K 20/125* (2013.01); *B23K 20/1255* (2013.01); *B23K 20/1265* (2013.01)

(58) Field of Classification Search
CPC ............ B23K 20/1255; B23K 20/1245; B23K 20/125; B23K 20/123; B23K 20/126
See application file for complete search history.

(56) References Cited

U.S. PATENT DOCUMENTS

| | | | |
|---|---|---|---|
| 6,168,066 B1 * | 1/2001 | Arbegast | B23K 20/1205 228/2.1 |
| 11,794,275 B2 * | 10/2023 | Miyawaki | B23K 28/02 |
| 12,172,228 B2 * | 12/2024 | Miyawaki | B23K 20/26 |
| 2003/0218052 A2 * | 11/2003 | Litwinski | B23K 20/1275 228/110.1 |
| 2023/0013259 A1 * | 1/2023 | Miyawaki | B23K 20/1265 |
| 2023/0014926 A1 * | 1/2023 | Miyawaki | B23K 20/125 |
| 2023/0019177 A1 * | 1/2023 | Miyawaki | B23K 11/11 |
| 2023/0311241 A1 * | 10/2023 | Miyawaki | B23K 20/126 228/112.1 |

FOREIGN PATENT DOCUMENTS

JP 2023013804 1/2023

OTHER PUBLICATIONS

JP2007268543A computer English translation (Year: 2007).*

* cited by examiner

*Primary Examiner* — Erin B Saad
(74) *Attorney, Agent, or Firm* — JCIPRNET

(57) ABSTRACT

A bonding device is used to bond a plate assembly including a first plate and a second plate and includes an anvil, a probe, a shoulder component, a driving mechanism, a power supply, and a control part. The anvil is configured to support a first surface of the plate assembly provided by the first plate. The probe is disposed at a position corresponding to the anvil to be opposite to a second surface of the plate assembly provided by the second plate. The shoulder component is disposed around the probe and has a via for the probe to pass through and an abutting surface for pressing the second surface. The anvil has a hemispherical surface facing the first surface and a receiving surface disposed at a position corresponding to the abutting surface. The anvil contacts the first surface with the hemispherical surface and the receiving surface.

4 Claims, 3 Drawing Sheets

BONDING DEVICE

CROSS-REFERENCE TO RELATED APPLICATION

This application claims the priority benefit of China application serial no. 202311164540.9, filed on Sep. 11, 2023. The entirety of the above-mentioned patent application is hereby incorporated by reference herein and made a part of this specification.

BACKGROUND

Technical Field

The disclosure relates to a bonding device.

Description of Related Art

In the prior art, resistance welding and friction stir welding may be listed as methods for bonding multiple metal plates, which can suppress gas generation more than conventional bonding methods to reduce the negative environmental impact on air quality. In addition, the friction stir welding consumes less electricity than the conventional bonding methods, contributing to improving energy efficiency during manufacturing. When three or more metal plates made of different materials are bonded through the resistance welding, it is difficult to maintain stable bonding strength for a long time. The friction stir welding is limited to the range of materials that can be effectively stirred and is not suitable for bonding three or more metal plates. Therefore, a bonding technology for bonding three or more metal plates by simultaneously using the resistance welding and the friction stir welding is developed (for example, Japanese Patent Publication No. 2023-013804).

In such a bonding device, when a plate assembly composed of multiple metal plates is placed between an anvil and a probe of the bonding device to be bonded via energization, two ends of the plate assembly may be easily bent and deformed by the abutment of shoulder components disposed around the probe, thereby increasing a conductive contact area (that is, expanding a current flow path) between the bent and deformed plate assembly and the anvil. At this time, it may be difficult to generate a nugget for bonding, which may cause difficulty in improving the bonding effect.

The disclosure provides a bonding device that can prevent the plate assembly from being bent and deformed to suppress an increase in the conductive contact area, thereby improving the bonding effect. Furthermore, it is expected to help reduce the environmental impact on air and improve energy efficiency during manufacturing.

SUMMARY

The disclosure provides a bonding device, which is used to bond a plate assembly including a first plate and a second plate configured to abut against the first plate and includes: an anvil, configured to support a first surface of the plate assembly provided by the first plate; a probe, disposed at a position corresponding to the anvil to be opposite to a second surface of the plate assembly provided by the second plate; a shoulder component, disposed around the probe and having a via for the probe to pass through and an abutting surface for pressing the second surface; a driving mechanism, configured to rotate the probe about a central axis intersecting the second surface and to move the probe forward or backward relative to the second plate along the central axis; a power supply, electrically connected to the anvil and the shoulder component, so that current flows through the plate assembly between the anvil and the shoulder component; and a control part, controlling operations of the driving mechanism and the power supply. The anvil has a hemispherical surface facing the first surface and being at least partially conductive and a receiving surface disposed at a position corresponding to the abutting surface of the shoulder component and being at least partially insulated, and the anvil contacts the first surface with the hemispherical surface and the receiving surface.

DESCRIPTION OF THE EMBODIMENTS

Figure 1:
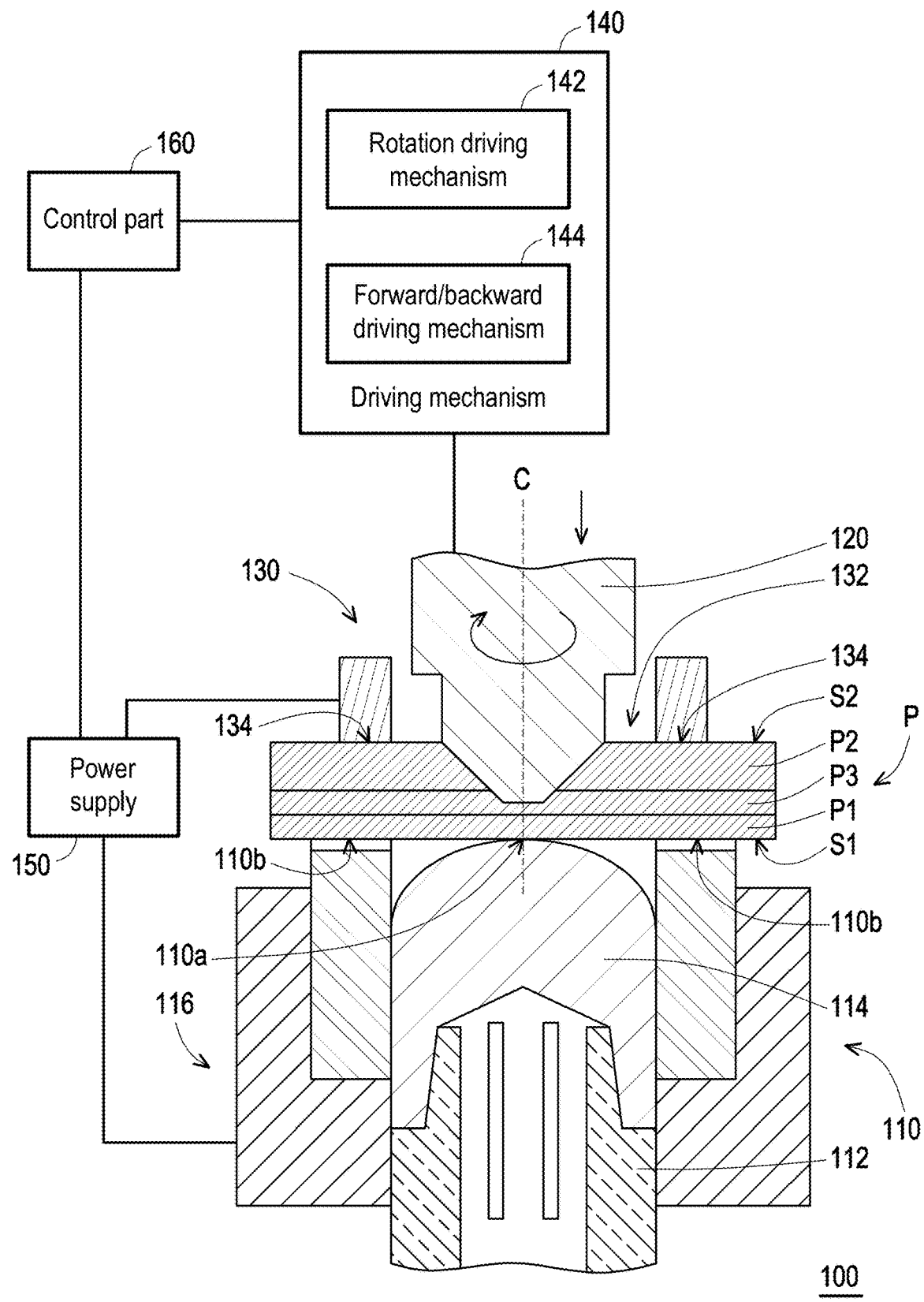
FIG. 1 is a cross-sectional schematic diagram of a bonding device for bonding a plate assembly including a first plate and a second plate according to an embodiment of the disclosure.

The disclosure provides a bonding device, which can prevent a plate assembly from being bent and deformed to suppress an increase in a conductive contact area, thereby improving the bonding effect.

The disclosure provides a bonding device, which is used to bond a plate assembly including a first plate and a second plate configured to abut against the first plate and includes: an anvil, configured to support a first surface of the plate assembly provided by the first plate; a probe, disposed at a position corresponding to the anvil to be opposite to a second surface of the plate assembly provided by the second plate; a shoulder component, disposed around the probe and having a via for the probe to pass through and an abutting surface for pressing the second surface; a driving mechanism, configured to rotate the probe about a central axis intersecting the second surface and to move the probe forward or backward relative to the second plate along the central axis; a power supply, electrically connected to the anvil and the shoulder component, so that current flows through the plate assembly between the anvil and the shoulder component; and a control part, controlling operations of the driving mechanism and the power supply. The anvil has a hemispherical surface facing the first surface and being at least partially conductive and a receiving surface disposed at a position corresponding to the abutting surface of the shoulder component and being at least partially insulated, and the anvil contacts the first surface with the hemispherical surface and the receiving surface.

In an embodiment of the disclosure, the anvil includes a handle part, a top part, and a receiving part. The handle part has a tapered portion at a front end, the top part has the hemispherical surface at a front end portion and has an engaging portion engaged with the tapered portion on an inner surface of a base end portion, and the receiving part surrounds an outer surface of the top part and overlaps with the tapered portion in a width direction and has the receiving surface at a front end portion.

In an embodiment of the disclosure, the handle part has an edge portion located below the tapered portion, the top part is installed on the handle part, and a lower end portion of the top part abuts the edge portion of the handle part.

In an embodiment of the disclosure, the receiving part includes a receiving portion and a holding portion. The receiving portion has the receiving surface contacting the first plate, the holding portion surrounds the receiving portion and is bonded to the handle part, and the receiving portion and the holding portion are separate components separately disposed.

Based on the above, in the bonding device of the disclosure, the anvil has the hemispherical surface facing the first surface of the first plate and being at least partially conductive and the receiving surface disposed at the position corresponding to the abutting surface of the shoulder component and being at least partially insulated, and the anvil contacts the first surface with the hemispherical surface and the receiving surface. In this way, the anvil in the bonding device reduces the conductive contact area with the first plate via the hemispherical surface, while receiving a load from the shoulder component during a bonding process via the receiving surface, thereby preventing the conductive contact area between the plate assembly and the anvil from increasing (that is, preventing a current flow path from expanding) due to bending deformation of the plate assembly to sufficiently generate a nugget for bonding via energization. Accordingly, the bonding device of the disclosure can prevent bending deformation of the plate assembly to suppress the increase of the conductive contact area, thereby improving the bonding effect.

Figure 2:
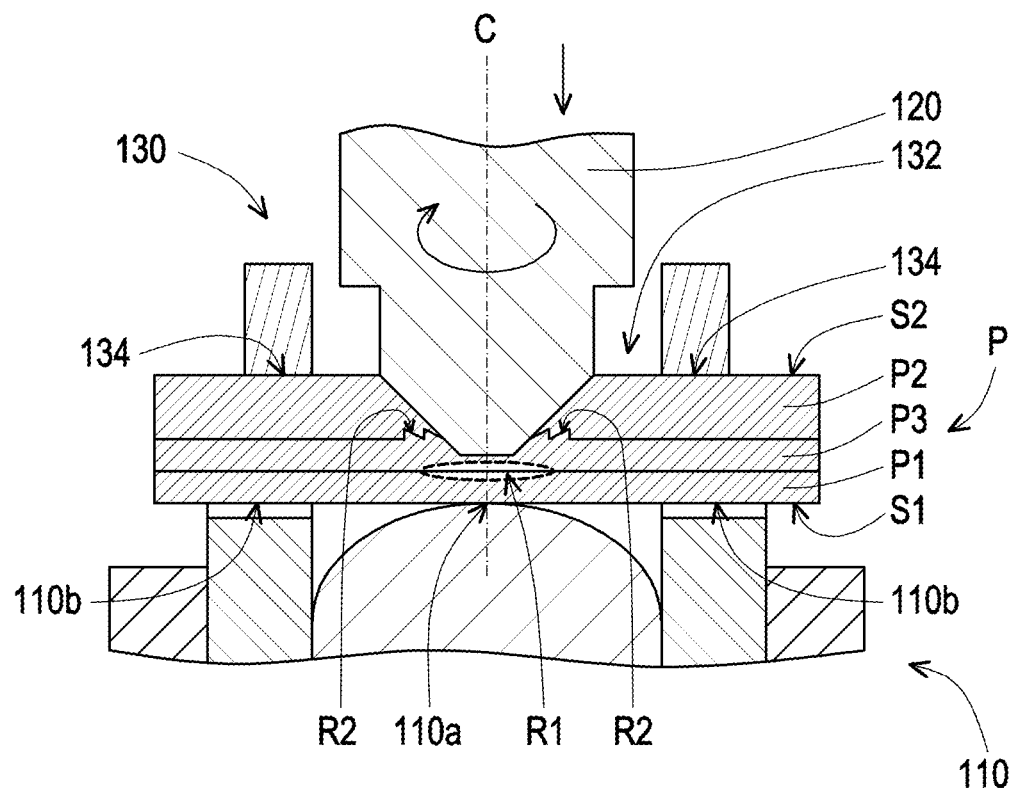
FIG. 2 is a partially enlarged schematic diagram of the bonding device shown in FIG. 1 during a bonding process.
Figure 3:
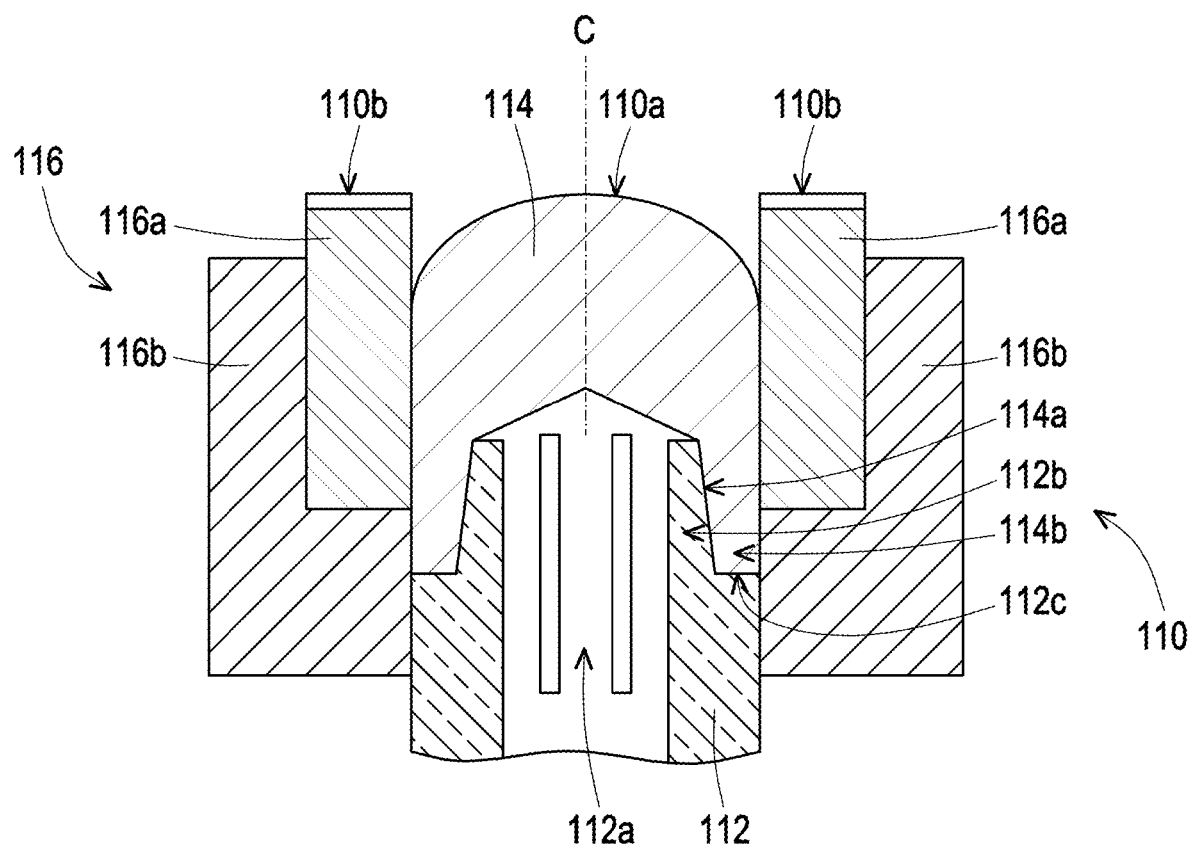
FIG. 3 is a cross-sectional schematic diagram of an anvil used in the bonding device shown in FIG. 1.

Reference will now be made in detail to exemplary embodiments of the disclosure, examples of the exemplary embodiments are illustrated in the drawings. FIG. 1 is a cross-sectional schematic diagram of a bonding device for bonding a plate assembly including a first plate and a second plate according to an embodiment of the disclosure, FIG. 2 is a partially enlarged schematic diagram of the bonding device shown in FIG. 1 during a bonding process, and FIG. 3 is a cross-sectional schematic diagram of an anvil used in the bonding device shown in FIG. 1. A bonding device 100 and an operation manner thereof of the embodiment will be described below with reference to FIG. 1 to FIG. 3. In the following description, the bonding device 100 energizes a plate assembly P in a vertical direction for bonding, but the direction is merely exemplary, and the disclosure may be applied to plate assemblies oriented in any expected direction and from any expected direction, such as laterally, upwardly, and obliquely, without departing from the scope of the disclosure. The disclosure does not limit the processing manner of bonding the plate assembly P by the bonding device 100, which may be adjusted according to requirements.

Please refer to FIG. 1. In the embodiment, the bonding device 100 is used to bond the plate assembly P including a first plate P1 and a second plate P2 configured to abut against the first plate P1. The first plate P1 and the second plate P2 in the plate assembly P extend along a horizontal plane, and the plate assembly P may include more plates (for example, a middle plate P3 sandwiched between the first plate P1 and the second plate P2) according to requirements. Furthermore, the plates in the plate assembly P are all conductive plates made of metal materials. The first plate P1 and the middle plate P3 may be made of the same material or similar materials, and the second plate P2 may be made of a different or dissimilar material. Furthermore, the materials of the first plate P1 and the middle plate P3 have higher strength and higher resistance than the material of the second plate P2. For example, the first plate P1 and the middle plate P3 are iron plates, and the second plate P2 is an aluminum plate. However, the disclosure does not limit the number and the materials of plates in the plate assembly P, which may be adjusted according to requirements.

Furthermore, in the embodiment, as shown in FIG. 1, the bonding device 100 includes an anvil 110, a probe 120, a shoulder component 130, a driving mechanism 140, a power supply 150, and a control part 160. The anvil 110 is configured to support a first surface S1 of the plate assembly P provided by the first plate P1. The probe 120 is disposed at a position corresponding to (for example, above) the anvil 110 to be opposite to a second surface S2 of the plate assembly P provided by the second plate P2. The shoulder component 130 is disposed around the probe 120 (for example, is an annular component surrounding the probe 120) and has a via 132 for the probe 120 to pass through and an abutting surface 134 for pressing the second surface S2. The driving mechanism 140 is configured to rotate the probe 120 about a central axis C intersecting the second surface S2 and to move the probe 120 forward or backward relative to the second plate P2 along the central axis C. The power supply 150 is electrically connected to the anvil 110 and the shoulder component 130, so that current flows through the plate assembly P between the anvil 110 and the shoulder component 130. The control part 160 controls the operations of the driving mechanism 140 and the power supply 150. Furthermore, the anvil 110 has a hemispherical surface 110a facing the first surface S1 and being at least partially conductive and a receiving surface 110b disposed at a position corresponding to the abutting surface 134 of the shoulder component 130 and being at least partially insulated, and the anvil 110 contacts the first surface S1 with the hemispherical surface 110a and the receiving surface 110b.

Specifically, in the embodiment, as shown in FIG. 1, at least part (for example, a part corresponding to the hemispherical surface 110a) of the anvil 110 is made of a conductive material, so that the anvil 110 may abut the first surface S1 of the plate assembly P provided by the first plate P1 with the at least partially conductive hemispherical surface 110a. Furthermore, at least part (for example, a part corresponding to the receiving surface 110b) of the anvil 110 is made of an insulating material, so that the anvil 110 may abut the first surface S1 of the plate assembly P provided by the first plate P1 with the at least partially insulated receiving surface 110b. Accordingly, the probe 120 is disposed above the anvil 110 to correspond to the anvil 110 and extends along the central axis C. The probe 120 is made of a hard material and preferably has a cylindrical shape (with the center of circle corresponding to the central axis C). Furthermore, the probe 120 is connected to the driving mechanism 140, so that the probe 120 may rotate about the central axis C and move forward or backward relative to the second plate P2 along the central axis C (that is, move up and down in the vertical direction) via the drive by the driving mechanism 140. However, the disclosure does not limit the specific structures of the anvil 110 and the probe 120, which may be adjusted according to requirements.

In addition, in the embodiment, as shown in FIG. 1, the shoulder component 130 has a rotationally symmetrical shape about the central axis C and is disposed above the anvil 110 and surrounds the probe 120. For the shoulder component 130, a middle portion is provided with the via 132 and a lower end portion forms the abutting surface 134. The shoulder component 130 may be made of a hard material, but not limited thereto. The via 132 is disposed along the central axis C and preferably has a circular hole shape. An inner diameter of the via 132 is greater than an outer diameter of the probe 120. During a process of the probe 120 being driven via the driving mechanism 140 to move forward relative to the second plate P2, the probe 120 passes through the via 132 (as shown in FIG. 1), and the via 132 and the probe 120 are concentrically separated. Furthermore, the probe 120 may also rotate about the central axis C. Here, although the probe 120 and the shoulder component 130 are illustrated as separate components, the shoulder component 130 may also be provided with a supporting structure for supporting the probe 120 (that is, the shoulder component 130 and the probe 120 are connected). Furthermore, the inner diameter of the via 132 may be only slightly greater than the outer diameter of the probe 120. When the probe 120 rotates about the central axis C, an inner peripheral surface of the via 132 may be in sliding contact with an outer peripheral surface of the probe 120. The disclosure does not limit the specific structure of the shoulder component 130 and the connection relationship between the shoulder component 130 and the probe 120, which may be adjusted according to requirements.

In addition, in the embodiment, as shown in FIG. 1, the driving mechanism 140 includes a rotation driving mechanism 142 for rotating the probe 120 about the central axis C and a forward/backward driving mechanism 144 for moving the probe 120 forward or backward along the central axis C. Furthermore, the driving mechanism 140 performs control by the control part 160, so that the probe 120 rotates about the central axis C and moves forward or backward along the central axis C. In addition, in other embodiments not shown, the anvil 110 and the shoulder component 130 may also be configured to move via the drive by the driving mechanism 140, so that the movements of the anvil 110 and the shoulder component 130 may also be controlled by the control part 160. Alternatively, the anvil 110 for supporting the plate assembly P and the shoulder component 130 for abutting the plate assembly P may also be moved or driven via other mechanisms. The disclosure does not limit the specific structure and the connection manner of the driving mechanism 140, which may be adjusted according to requirements.

Furthermore, in the embodiment, the power supply 150 is electrically connected to the anvil 110 and the shoulder component 130 (such as being each connected through a sliding contact mechanism or a flexible cable not shown). At least part (for example, the hemispherical surface 110a) of the anvil 110 is conductive, and at least part (for example, the abutting surface 134) of the shoulder component 130 is conductive. Furthermore, the control part 160 controls the operation of the power supply 150, so that current flows between the anvil 110 and the shoulder component 130. In this case, since the hemispherical surface 110a of the anvil 110 contacts the first surface S1 provided by the first plate P1 and the abutting surface 134 of the shoulder component 130 presses the second surface S2 provided by the second plate P2, and the hemispherical surface 110a, the abutting surface 134, and the plate assembly P are conductive, current of the power supply 150 may be transmitted between the anvil 110 and the shoulder component 130 and flow through the plate assembly P to energize the plate assembly P, so as to bond the plate assembly P in a subsequent step. However, the disclosure does not limit the specific structures and the connection manner of the power supply 150 and the control part 160, which may be adjusted according to requirements.

It can be seen that in the embodiment, as shown in FIG. 1 and FIG. 2, during a process of bonding the plate assembly P using the bonding device 100, the plate assembly P is placed between the anvil 110 and the shoulder component 130, so that the anvil 110 supports the first surface S1 of the first plate P1 and the shoulder component 130 presses the second surface S2 of the second plate P2 with the abutting surface 134. As an example, the plate assembly P may be placed on the anvil 110 with the first surface S1 facing downward, and the shoulder component 130 may press the second surface S2 with the abutting surface 134. Thus, the anvil 110 squeezes the first surface S1 of the plate assembly P from below, and the shoulder component 130 squeezes the second surface S2 of the plate assembly P from above. The hemispherical surface 110a and the receiving surface 110b of the anvil 110 are substantially located at the same horizontal height to be able to simultaneously contact the first surface S1 of the plate assembly P provided by the first plate P1. Furthermore, the hemispherical surface 110a of the anvil 110 is at least partially conductive to be used to energize the plate assembly P. Correspondingly, the receiving surface 110b of the anvil 110 is at least partially insulated to be used to bear a load applied from the shoulder component 130 to the plate assembly P (to be not electrically conducted with the plate assembly P to not affect bonding).

Next, when the plate assembly P is pressed between the anvil 110 and the shoulder component 130, the probe 120 rotates about the central axis C and moves forward relative to the second surface S2 (that is, moves downward). An end portion of the probe 120 is inserted into the second plate P2 and deforms the second plate P2. At this time, due to frictional heat generated by the rotating probe 120, a part of the second plate P2 surrounding the probe 120 becomes a plastic fluid and generates an annular plastic fluid region around the probe 120. Once the end portion of the probe 120 reaches the middle plate P3, the control part 160 enables current provided by the power supply 150 to flow between the anvil 110 and the shoulder component 130. When current flows between the anvil 110 and the shoulder component 130, the probe 120 keeps rotating and moves further downward (forward), and the end portion of the probe 120 is inserted into the middle plate P3. As a result, resistance heat generated in the first plate P1 and the middle plate P3 and frictional heat generated by the rotation of the probe 120 generates a melting region (a region R1 shown in FIG. 2) between the first plate P1 and the middle plate P3. At the same time, a part of the materials of the second plate P2 and the middle plate P3 near the probe 120 plastically flows. As a result, a part of the middle plate P3 penetrates into the second plate P2 (a region R2 as shown in FIG. 2) via the plastic flow.

After the energizing operation is completed, the control part 160 controls the power supply 150 to stop supplying current between the anvil 110 and the shoulder component 130, and controls the driving mechanism 140, so that the probe 120 moves backward (that is, moves upward) along the central axis C while rotating. When current stops and the probe 120 moves away, the melting region (for example, the region R1 of FIG. 2) between the first plate P1 and the middle plate P3 solidifies to form a nugget, so that the first plate P1 and the middle plate P3 are firmly bonded to each other via the nugget formed by the melting region. Furthermore, a part of the middle plate P3 penetrates into the second plate P2 (for example, the region R2 of FIG. 2) via the plastic flow, so that the second plate P2 and the middle plate P3 are also firmly bonded to each other via the penetrated part. Subsequently, the anvil 110 and the shoulder component 130 move away from the plate assembly P, so that the bonded plate assembly P may be removed. However, the above description is only one operating process of the bonding device 100 of the embodiment. The operating process of the bonding device 100 may be appropriately adjusted according to the specific structure of the bonding device 100 and the number and the materials of plates of the plate assembly P to be bonded, and the disclosure is not limited thereto.

It can be seen that in the embodiment, the anvil 110 has the hemispherical surface 110a facing the first surface S1 of the first plate P1 and being at least partially conductive and the receiving surface 110b disposed at the position corresponding to the abutting surface 134 of the shoulder component 130 and being at least partially insulated, and the anvil 110 contacts the first surface S1 with the hemispherical surface 110a and the receiving surface 110b. That is, the anvil 110 contacts the first surface S1 with the at least partially conductive hemispherical surface 110a to energize the plate assembly P and contacts the first surface S1 with the at least partially insulated receiving surface 110b to bear the load applied to the plate assembly P by the abutting surface 134 of the shoulder component 130. In this way, the anvil 110 in the bonding device 100 reduces a conductive contact area with the first plate P1 via the hemispherical surface 110a, while receiving the load from the shoulder component 130 during the bonding process via the receiving surface 110b, thereby preventing the conductive contact area between the plate assembly P and the anvil 110 from increasing (that is, preventing the current flow path from expanding) due to bending deformation of the plate assembly P to sufficiently generate the nugget for bonding via energization. Accordingly, the bonding device 100 can prevent the plate assembly P from being bent and deformed to suppress an increase in the conductive contact area, thereby improving the bonding effect.

More specifically, in the embodiment, as shown in FIG. 3, the anvil 110 includes a handle part 112, a top part 114, and a receiving part 116. In other words, the anvil 110 is composed of at least the three parts, the handle part 112, the top part 114, and the receiving part 116. The handle part 112 has a flow path 112a inside and has a tapered portion 112b at a front end (that is, an upper end). The top part 114 has the hemispherical surface 110a at a front end portion (that is, an upper end portion) and has an engaging portion 114a engaged with the tapered portion 112b on an inner surface of a base end portion (that is, a lower end portion). The receiving part 116 surrounds an outer surface of the top part 114 and overlaps with the tapered portion 112b in a width direction (that is, a left-right direction) and has the receiving surface 110b at a front end portion (that is, an upper end portion).

It can be seen that in the embodiment, the handle part 112 is used as a base of the anvil 110, so that the flow path 112a as a cooling structure for cooling water to flow is disposed inside, and the tapered portion 112b at the front end thereof is gradually inclined outward from top to bottom. Correspondingly, the top part 114 is installed on the handle part 112 to provide the at least partially conductive hemispherical surface 110a at the front end portion thereof. Therefore, the top part 114 may be made of a conductive material (that is, to be used as an electrode) or may be only partially conductive (for example, the hemispherical surface 110a), and the disclosure is not limited thereto. Furthermore, the engaging portion 114a disposed at the base end portion of the top part 114 is, for example, an edge part of an opening gradually expanding outward from top to bottom. In this way, the engaging portion 114a of the top part 114 may be slid along the tapered portion 112b and fixed onto the handle part 112 during an installing process, so that the top part 114 may be more easily installed on the handle part 112. Furthermore, the receiving part 116 is formed in a cylindrical shape and is installed on an outer periphery of the handle part 112 and the top part 114 to provide the at least partially insulated receiving surface 110b at the front end portion thereof. Therefore, the receiving part 116 may be made of an insulating material or may be only partially insulated (by, for example, providing an insulating material on the receiving surface 110b), and the disclosure is not limited thereto. Furthermore, the receiving part 116 surrounds the outer surface of the top part 114 (with a small gap between the two), and a range of the outer surface of the top part 114 surrounded by the receiving part 116 includes the tapered portion 112b, so as to limit an installation position of the top part 114 (that is, to limit displacement of the engaging portion 114a engaged with the tapered portion 112b).

Through the above arrangement, when the plate assembly P is pressed between the anvil 110 and the shoulder component 130 and the probe 120 penetrates into the plate assembly P, the load applied to the plate assembly P by the probe 120 and the shoulder component 130 is transmitted toward the hemispherical surface 110a (for example, provided by the top part 114) and the receiving surface 110b (for example, provided by the receiving part 116) of the anvil 110. At this time, since the receiving part 116 surrounds the outer surface of the top part 114, an outer periphery of the top part 114 is limited, so that the engaging portion 114a of the top part 114 does not further move downward along the tapered portion 112b of the handle part 112 and expand outward. Furthermore, the receiving surface 110b of the receiving part 116 may be used to receive most of the load from above (that is, the shoulder component 130 and the probe 120). It can be seen from this that a conductive part (that is, the hemispherical surface 110a) and an insulating part (that is, the receiving surface 110b) in the anvil 110 may be appropriately separately disposed and easily assembled. Furthermore, the anvil 110 suppresses displacement deformation (that is, suppresses a change in a processing position of the hemispherical surface 110a) of the top part 114 relative to the handle part 112 in a pressurizing direction (that is, downward) via the receiving part 116, thereby sufficiently generating the nugget for bonding via energization. However, the disclosure is not limited thereto and may be adjusted according to requirements.

Furthermore, in the embodiment, as shown in FIG. 3, the handle part 112 has an edge portion 112c located below the tapered portion 112b, the top part 114 is installed on the handle part 112, and a lower end portion 114b of the top part 114 abuts the edge portion 112c of the handle part 112. In other words, in addition to using the cylindrical receiving part 116 to limit the installation position of the top part 114 from the outside, the installation position of the top part 114 may also be limited by providing the edge portion 112c below the tapered portion 112b of the handle part 112. Since the edge portion 112c is located below the tapered portion 112b and extends outward compared to the tapered portion 112b, the edge portion 112c may serve as a moving end point of the engaging portion 114a of the top part 114 moving downward along the tapered portion 112b, and the lower end portion 114b of the top part 114 abuts the edge portion 112c. In this way, when the load applied to the plate assembly P by the probe 120 and the shoulder component 130 is transmitted toward the anvil 110, since the lower end portion 114b of the top part 114 abuts the edge portion 112c of the handle part 112, the engaging portion 114a of the top part 114 does not move further downward along the tapered portion 112b of the handle part 112 and expand outward. Thus, displacement deformation of the top part 114 relative to the handle part 112 in the pressurizing direction (that is, downward) can be suppressed (that is, the change in the processing position of the hemispherical surface 110a can be suppressed), thereby sufficiently generating the nugget for bonding via energization. However, the disclosure is not limited thereto and may be adjusted according to requirements.

In addition, in the embodiment, as shown in FIG. 3, the receiving part 116 includes a receiving portion 116a and a holding portion 116b. The receiving portion 116a has the receiving surface 110b contacting the first plate P1, the holding portion 116b surrounds the receiving portion 116a and is bonded to the handle part 112, and the receiving portion 116a and the holding portion 116b are separate components separately disposed. In other words, the receiving part 116 is composed of at least the two parts, the receiving portion 116a and the holding portion 116b. The receiving portion 116a is formed in a cylindrical shape and surrounds the outer surface of the top part 114 (with a small gap between the two). Furthermore, the receiving portion 116a provides the receiving surface 110b on an outer periphery of the hemispherical surface 110a. Therefore, the receiving portion 116a may be made of an insulating material or may be only partially insulated (by, for example, providing an insulating material on the receiving surface 110b), and the disclosure is not limited thereto. Correspondingly, the holding portion 116b is formed in a cylindrical shape to surround an outer periphery of the receiving portion 116a. Furthermore, a lower side of the holding portion 116b surrounds and contacts the engaging portion 114a of the top part 114 to transmit current of the power supply 150 (as shown in FIG. 1) to the hemispherical surface 110a of the top part 114, and the lower side of the holding portion 116b is further bonded to (for example, screwed to) the handle part 112 for fixation. Therefore, the holding portion 116b may be made of a conductive material or may be only partially conductive, and the disclosure is not limited thereto.

It can be seen that in the embodiment, an insulating part (that is, the receiving portion 116a) and a conductive part (that is, the holding portion 116b) in the receiving part 116 may be appropriately separately disposed and easily assembled. Furthermore, in a case where the receiving portion 116a is worn due to contact with the first plate P1 of the plate assembly P, etc., the receiving portion 116a may be easily replaced. That is, it is not necessary to replace the entire receiving part 116, but only the receiving portion 116a needs to be detached from the holding portion 116b and replaced with a new receiving portion 116a, so that the size of parts to be replaced is greatly reduced to suppress the cost of consumables. However, the above description is only an example of the anvil 110, and the disclosure does not limit the anvil 110 to be composed of the handle part 112, the top part 114, and the receiving part 116, nor does the disclosure limit the receiving part 116 to be composed of the receiving portion 116a and the holding portion 116b, nor does the disclosure limit whether the flow path 112a, the tapered portion 112b, the engaging portion 114a, and the edge portion 112c are provided. As long as the anvil 110 in the bonding device 100 has the at least partially conductive hemispherical surface 110a to reduce the conductive contact area with the first plate P1 and has the at least partially insulated receiving surface 110b to receive the load from the shoulder component 130 during the bonding process, the disclosure does not limit the specific structural composition of the anvil 110, which may be adjusted according to requirements.

In summary, in the bonding device of the disclosure, the anvil has the hemispherical surface facing the first surface of the first plate and being at least partially conductive and the receiving surface disposed at the position corresponding to the abutting surface of the shoulder component and being at least partially insulated, and the anvil contacts the first surface with the hemispherical surface and the receiving surface. In this way, the anvil in the bonding device reduces the conductive contact area with the first plate via the hemispherical surface, while receiving the load from the shoulder component during the bonding process via the receiving surface, thereby preventing the conductive contact area between the plate assembly and the anvil from increasing (that is, preventing the current flow path from expanding) due to bending deformation of the plate assembly to sufficiently generate the nugget for bonding via energization. Preferably, the anvil includes the handle part, the top part, and the receiving part. The handle part has the tapered portion at the front end, the top part has the engaging portion engaged with the tapered portion on the inner surface of the base end portion, and the receiving part surrounds the outer surface of the top part and overlaps with the tapered portion in the width direction. In this way, the anvil suppresses displacement deformation of the top part relative to the handle part in the pressurizing direction (that is, suppresses the change in the processing position of the hemispherical surface) via the receiving part, thereby sufficiently generating the nugget for bonding via energization. Accordingly, the bonding device of the disclosure can prevent bending deformation of the plate assembly to suppress the increase of the conductive contact area, thereby improving the bonding effect.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A bonding device, used to bond a plate assembly comprising a first plate and a second plate configured to abut against the first plate, comprising:
   an anvil, configured to support a first surface of the plate assembly provided by the first plate;
   a probe, disposed at a position corresponding to the anvil to be opposite to a second surface of the plate assembly provided by the second plate;
   a shoulder component, disposed around the probe and having a via for the probe to pass through and an abutting surface for pressing the second surface;
   a driving mechanism, configured to rotate the probe about a central axis intersecting the second surface and to move the probe forward or backward relative to the second plate along the central axis;
   a power supply, electrically connected to the anvil and the shoulder component, so that current flows through the plate assembly between the anvil and the shoulder component; and
   a control part, controlling operations of the driving mechanism and the power supply, wherein
   the anvil has a hemispherical surface facing the first surface and being at least partially conductive and a receiving surface disposed at a position corresponding to the abutting surface of the shoulder component and being at least partially insulated, and the anvil contacts the first surface with the hemispherical surface and the receiving surface.

2. The bonding device according to claim 1, wherein:

the anvil comprises a handle part, a top part, and a receiving part, the handle part has a tapered portion at a front end, the top part has the hemispherical surface at a front end portion and has an engaging portion engaged with the tapered portion on an inner surface of a base end portion, and the receiving part surrounds an outer surface of the top part and overlaps with the tapered portion in a width direction and has the receiving surface at a front end portion.

3. The bonding device according to claim 2, wherein:

the handle part has an edge portion located below the tapered portion, the top part is installed on the handle part, and a lower end portion of the top part abuts the edge portion of the handle part.

4. The bonding device according to claim 2, wherein:

the receiving part comprises a receiving portion and a holding portion, the receiving portion has the receiving surface contacting the first plate, the holding portion surrounds the receiving portion and is bonded to the handle part, and the receiving portion and the holding portion are separate components separately disposed.

\* \* \* \* \*